United States Patent [19]

Champ et al.

[11] 4,037,928
[45] July 26, 1977

[54] VISUAL IMAGE DISPLAY DEVICE

[75] Inventors: Robert Bruce Champ; Meredith David Shattuck, both of San Jose, Calif.

[73] Assignee: International Business Machines Corporation, Armonk, N.Y.

[21] Appl. No.: 693,073

[22] Filed: June 4, 1976

[51] Int. Cl.² .............................................. G02F 1/16
[52] U.S. Cl. ............................................. 350/160 R
[58] Field of Search ............ 350/160 R, 160 P, 161 S, 350/161 P, 311, 312

[56] References Cited

U.S. PATENT DOCUMENTS

| 3,807,832 | 4/1974 | Castellion | 350/160 R |
| 3,840,287 | 10/1974 | Witzke et al. | 350/160 R |
| 3,847,468 | 11/1974 | Clasen et al. | 350/160 R |
| 3,892,472 | 7/1975 | Giglia | 350/160 R |

Primary Examiner—William L. Sikes
Attorney, Agent, or Firm—Joseph E. Kieninger

[57] ABSTRACT

A visual image display device with improved resolution contains a pair of conductive electrodes in spaced relationship. Adjacent one electrode is a first barrier layer which is typically a resin such as polyamide containing a readily oxidizable and reducible material such as zinc nitrate. Adjacent the other electrode is a thin film of solvent, for example, 1,2-dichloroethane. Positioned between the film of solvent and the first barrier layer is a second barrier layer which is a normally light transmitting recording medium. The second barrier layer is both photoionizable and capable of electrochemically producing a colored species. Typically the second barrier layer is a solid containing a resin such as polyvinyl butyral, an active material such as 1-p-anisyl-3 diethylamino styryl-5-diethylaminophenyl-2-pyrazoline and, in selected embodiments, an activator such as carbon tetrachloride.

12 Claims, 1 Drawing Figure

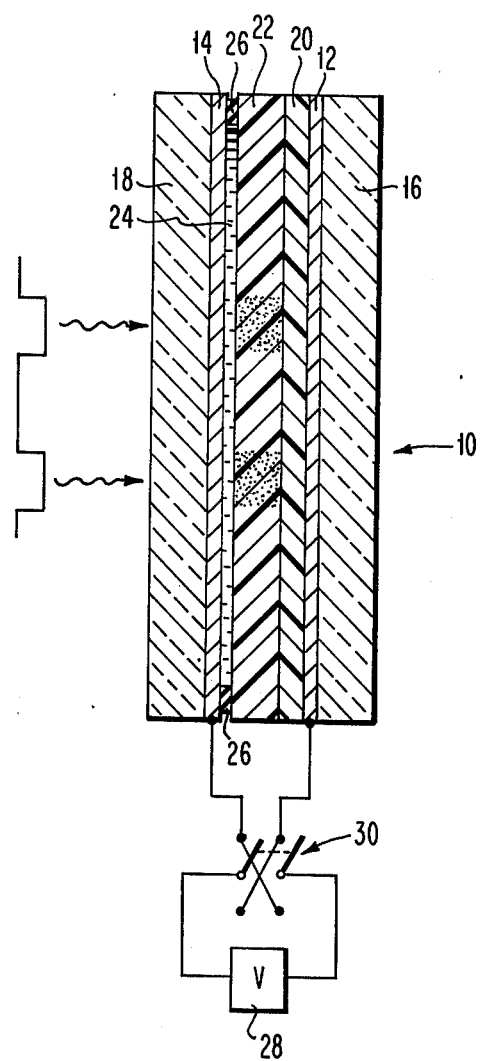

VISUAL IMAGE DISPLAY DEVICE

FIELD OF THE INVENTION

This invention relates to optically addressable display devices and more particularly to devices that have improved resolution.

BRIEF DESCRIPTION OF PRIOR ART

Many different approaches to direct view display devices are known. One approach is to use a photochromic material in a display device to produce a direct view image. However, these devices are of relatively low optical sensitivity and require the use of thermal or in some case visible radiation to erase the image and allow subsequent reuse.

The prior art also teaches the use of structural electrode arrays to produce electrochromic images in the form of characters and images. There is a one-to-one correspondence between the electrodes or activated electrode segment and the resulting image. This in general reduces the versatility of the device due to preconfiguration requirements and also presents certain difficulties in addressing and driving the display.

Another approach is to use a device with a photoconductive material overlaying an electrochromtic material. The optical image reduces the resistance of the photoconductive material in the exposed area so that the corresponding area of the electrochromic material is energized by a voltage across the cell. This configuration solves the electrode problem of electrochromic devices but requires a more complex structure due to the layered structure. The materials must be selected for compatibility with all the other materials. Furthermore, the exposure and application of the voltage must be simultaneous unless a persistent photoconductor is used.

Still another approach is described in copending patent application Ser. No. 582,045 filed May 29, 1975 and assigned to the assignee of the present invention. This application is included herein by reference thereto. The direct view display device described in that application includes a pair of conductive electrodes in spaced relationship and a suitable recording medium occupying the space between the electrodes. The recording medium exhibits the properties of being photoionizable and capable of electrochemically producing colored species. The image is produced by exposing the medium to an optical pattern of activating radiation of an intensity suitable to produce a latent image of the pattern and then applying a low voltage of a first polarity across the electrodes to produce a very dense image corresponding to the pattern. The image can be erased by applying a low voltage of opposite polarity across the electrodes and the display device can then be reused. These devices are suitable for many applications. In some instances, however, it is desirable to have a walk away copy, i.e., to be able to remove the copy from the device. Another area of interest in devices of this type is to have improved resolution as well as to increase the lifetime of the device.

SUMMARY OF THE INVENTION

It is a primary object of this invention to provide an improved visual image display device.

It is another object of this invention to provide a visual image display device with improved resolution.

It is still another object of this invention to provide a visual image display device having an increased lifetime.

It is yet still another object of this invention to provide a visual image display device in which a walk away copy can be made.

These and other objects are accomplished by a visual image display device having two conductive electrodes in spaced relationship. Adjacent one electrode is a first barrier layer which is typically a resin such as polyamide containing a readily oxidizable and reducible material such as zinc nitrate. Adjacent the other electrode is a thin film of solvent, for example, 1, 2-dichloroethane. Positioned between the film of solvent and the first barrier layer is a second barrier layer which is a normally light transmitting recording medium. The second barrier layer is both photoionizable and capable of electrochemically producing a colored specie. Typically the second barrier layer is a solid containing a resin such as polyvinyl butyral, an active material such as 1-p-anisyl-3 diethylamino styryl-5-diethylaminophenyl -2-pyrazoline and, in selected embodiments, an activator such as carbon tetrachlorde.

Other objects of this invention will be apparent from the following detailed description, reference being made to the accompanying drawing wherein the specific embodiment of the invention is shown.

BRIEF DESCRIPTION OF THE DRAWING

The drawing is a cross-sectional view of a display device embodying the invention.

DESCRIPTION OF THE ILLUSTRATIVE EMBODIMENT

The visual image display device 10 contains transparent electrodes 12 and 14 on substrates 16 and 18, respectively. The transparent electrodes 12 and 14 are typically NESA material, that is, $SnO_2$, $In_2O_3$ and mixtures thereof or it may be a thin layer of aluminum, gold, platinum or equivalent materials. In a preferred embodiment electrode 12 is aluminum and electrode 14 is $SnO_2$. The substrates 16 and 18 are typically glass or a clear polymer although equivalent transparent materials may be used. In a preferred embodiment substrate 16 is Mylar film and substrate 18 is glass.

Positioned between electrodes 12 and 14 and adjacent to electrode 12 is barrier layer 20. The barrier layer 20 not only introduces the assymetry into the display cell 10 necessary for erasure, but also increases enhancement efficiency. The barrier layer 20 comprises a suitable matrix such as polymer which contains an appropriate amount of a material that is readily oxidizable and reducible, but does not change its color during the erase cycle.

Several techniques for forming the barrier layer 20 on the conductive electrode 12 are known and they include methods such as dip coating, spin coating and use of a doctor blade. The most uniform and reproducible coatings have been obtained by dip coating. Using a formulation consisting of: 41.2g of 4% 8061 Elvamide nylon resin (a polyamide resin) in ethanol, 1.8g $H_2O$ and 0.2g zinc nitrate, (with respect to total resin/solvent weight), barrier layers of 2u thickness have been formed at a dip speed of 2 ft/min. The coated electrode is then heat cured at 65°-70° for 10 minutes to remove excess solvent. The resulting barrier layer 20 is optically transparent and free from bubbles and surface reticulation. The amount of redox substance in the completed barrier layer 20 can vary from about 1% to about 60% but the preferred amount is from about 20% to about 40% by weight. Other polymer and redox substances can be used such as a sulfonated polystyrene polymer and zine chloride, lead nitrate and cadmium nitrate redox substances. Other similar known redox substance should be operable provided they are compatible in this device.

In accordance with this invention a second barrier layer 22 is positioned between barrier layer 20 and electrode 14 and adjacent barrier layer 20. The second barrier layer 22 is a solid material which is normally a substantially light transmitting medium in the visible spectrum having the properties of being both photo-ionizable and capable of electrochemically producing a colored specie.

The layer 22 contains a resin, an active material and in some cases, an activator. An activator is not needed with certain active materials, for example, the spiropyrans. An activator is also not necessary when a walking copy is desired as will be hereinafter fully described.

Resins suitable for use in layer 22 must be clear or transparent and have marginal solubility in layer 24 hereinafter fully described. Resins which may be used, but are not limited to, are polylvinyl butyral, polycarbonate, polyamide, polyacrylates, polymethacrylates, polyvinylcarbazole, and the like.

Active materials contemplated for use in layer 22 of this invention can be selected from any of a number of active materials which demostrate the properties of being both photoionizable and capable of electrochemically producing colored species. The active materials that can be used at the present time fall within one of three groups or classes of chemical compounds. These groups are the triaryl pyrazolines, spiropyrans and redox polymeric materials.

The preferred concentration of the active materials is 2 to 20 wt %. The concentration can be higher or lower than the preferred range based on desired visual contrast considerations.

The triaryl pyrazolines are the most effective active materials. Specific compounds of this group which are effective are 1-phenyl 3-p-diethylaminostyryl-5-p-diethylamino-phenyl-2-pyrazoline (hereinafter referred to as DEASP). 1-p-anisyl-3-p-diethylaminostyryl-5-p-diethylaminophenyl-2-pyrazoline (hereinafter refrerred to as M-DEASP), and 1phenyl-3-p-piperdino-phenyl-5-(2-thienyl)-2-pyrazoline.

Other triaryl pyrazoline compounds having the structure shown below which demonstrate the properties of being both photoionizable and capable of electrochemically producing chemical species are included.

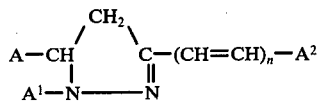

wherein $n$ is zero or one, and $A, A^1$ and $A^2$ are each aryl radicals.

In this formula when $n=1$ the materials may be classified chemically as styryl pryazolines. It is preferred that one or more of the aryl groups be substituted, most prefereably with groups known in the art to be electron donating groups. The most preferred substituent groups are methoxy, ethoxy, dimethyl amino, diethyl amino and the like. It is not preferred to substitute the aryl groups with electron withdrawing groups such as nitro and cyano.

Activators when used in layer 22 may be polyhalogenated alkanes such as carbon tetrachloride, carbon tetrabromide, idoform and bromoform, and other polyhalogenated compounds such as 2, 2, 2-tribromethanol and dichloracetone. The concentration of the activator used, depends upon the active material and resins used. The activator concentration may be 5 to 50 wt%.

The layer 22 may be formed by preparing a solution containing the resin, active material and activator when desired in a suitable solvent such as chloroform. The solution is then sprayed or spun onto the layer 21 and dried to form a coating or layer with the desired thickness. The preferred thickness is of the order of 10 microns although the thickness may vary from 7 to 100 microns.

A film solvent 24 is positioned bewteen layer 22 and electrode 14. Suitable solvents for use in the film 24 are halogenated hydrocarbon solvents and other non-aqueous solvents such as acetonitrile and tetrahydrofuran which only marginally dissolve the resin used. Preferred solvents for use with the polyvinylbutyral resins are chloroform, 1, 2, dichloroethane, dichloromethane and mixtures thereof. The film 24, in walk away copy embodiments also contains an activator. The thickness of the film 24 is that which is sufficient to make uniform electrical contact between the layer 22 and electrode 14.

The display cell 10 can be transparent under ambient light. However, when a region of a cell is exposed by light distribution as shown in the drawing to the light of the wavelength to which the active material in layer 22 is sensitive with an energy density of about 25 to 500 microjoules per centimeter squared, a latent image is produced in the irradiated region.

Image enhancement comprises a conversion of the latent image into a high density and high contrast visible image, and the enhancement is achieved by the momentary application of a potential on the electrode which results in the subsequent production of colored species in those areas that have been exposed to light. In the embodiment shown in the drawing, the enhancement is accomplished by the application of potential of about 2 to 20 volts from voltage source 28 by switch 30 to the device so that the coloration in the same region is intensified. The intensification is proportional to the applied voltage and the duration of its application.

The image is formed on the surface of the second barrier layer which comes in contact with the film of solvent. It has been observed that the second barrier layer can be removed from the device with the image intact. As a result a walk away copy is formed. The walk away copy can be subsequently returned to the device and erased when there is the necessary contact with the film of solvent and the potential is applied in the reverse direction.

EXAMPLE 1

The device was formed by providing a first barrier layer on a 7 mil aluminized Mylar. This barrier layer was formed by coating at a speed of 2 f.p.m. a solution containing 41.2g 4% polyamide (Elavanide 8061 made by Dupont) in ethanol, 1.8g water and 0.2 g zinc nitrate. The thickness was 2.5 microns. This barrier layer was air cured to remove the solvent. A second barrier was formed by coating at a speed of 8 f.p.m. a solution containing 10g 5% polyvinyl butyral (Butvar B73 made by Monsanto) in 10g chloroform, 2g carbon tetrachloride and 1.0g M-DEASP. The thickness was 10 microns. A film of 1, 2, dichoroethane was placed between the second barrier and a tin oxide coated glass substrate to form the device. The second barrier layer was exposed to ultraviolet light to produce a latent image. A potential of about +5 volts was applied to the tin oxide electrode to enhance the image. The second barrier layer was removed and the image remained intact. The second barrier layer was then put back into its proper position in contact with the 1, 2, dichloroethane, the potential was reversed and the image was erased.

EXAMPLE 2

The same device as in Example 1 except a film dichlorobutane was used instead of 1, 2, dichoroethane. Similar results were obtained.

EXAMPLE 3

The same device as in Example 1 except a film of 1, 1, 1 trichlorethane was used instead of 1, 2 dichoroethane. Similar results were obtained.

EXAMPLES 4–7

The same device as in Example 1 except the polyvinyl butyral in the second barrier layer was replaced by one of the following resins:
  polyamide (Milvex 4000)
  styrl-n-butyl methacrylate
  poly-n-vinyl carbazole
  polyacrylate (Acryloid C-10LV)
Similar results were obtained.

EXAMPLE 8

The same device as in Example 1 except the second barrier layer has been modified. The activator carbon tetrachloride is not present. A separate coating or film of 2.5% nitrocellulose polymer dissolved in tetrahydrofuran was applied at 5 f.p.m. The nitrocellulose film served as the activator as well as being resistant to solvent attack.

EXAMPLE 9

The same device as in Example 8 except the solvent film consisted of a mixture of 10cc 1, 2 dichoroethane, 0.1g carbon tetrabromide and .02g 2, 4-bis[2-hydroxy-4-diethylamino phenyl]-1,3-cyclo butadiene diylium-1, 3-diolate. The device was exposed to photoflood light through a Wratten No. 29 filter to give an image that was enhanced by the application of a potential of +5 volts. Since the Wratten No. 29 filter transmits wavelengths longer than 6000 A., sensitization was achieved with this device.

Although a preferred embodiment of this invention has been described, it is understood that numerous variations may be made in accordance with the principles of this invention.

What is claimed is:

1. A visual image display device comprising:
  a first and a second conductive electrode in spaced relationship;
  a first barrier layer positioned between said electrodes adjacent to said first electrode,
  a film of solvent positioned between said electrodes and adjacent
  a second barrier layer positioned between said first barrier layer and said solvent film, said second layer being a normally light transmitting recording medium and having the properties of being both photoionizable and capable of electrochemically producing a colored specie, and
  a voltage source and means for selectively applying this voltage between the electrodes to produce an electric field.

2. A device as described in claim 1 wherein said film of solvent is a chlorinated solvent.

3. A device as described in claim 2 wherein said film of solvent is taken from the group consisting of 1, 2-dichloroethane,
  dichlorobutane, and
  1, 1, 1-trichloroethane.

4. A device as described in claim 1 wherein said film of solvent is sufficiently thick to make electrical contact between said second barrier and said second electrode.

5. A device as described in claim 1 wherein said film of solvent contains an activator.

6. A visual image display device comprising:
  a first and a second conductive electrode in spaced relationship;
  a first barrier layer positioned between said electrodes and adjacent to said first electrode,
  a film of solvent positioned between said electrodes and adjacent to said second electrode,
  a second barrier layer positioned between said first barrier layer and said solvent film, said second layer being normally light transmitting recording medium and having the properties of being both photoionizable and capable of electrochemically producing colored species, said second layer being solid containing a resin and an active material, and
  a voltage source and means for selectively applying this voltage between the electrodes to produce an electric field.

7. A device as described in claim 6 wherein said active material is a triaryl pyrazoline.

8. A device as described in claim 6 wherein said resin is taken from the group consisting of
  polyvinyl butyral
  polycarbonate
  polyamide
  polyacrylates
  polymethacrylates
  polyvinylcarbazole.

9. A device as described in claim 6 wherein said second barrier layer contains an activator.

10. A device as described in claim 6 wherein said second barrier layer is 7 to 100 microns thick.

11. A device as described in claim 6 wherein said second barrier is in the form of a tape, said tape adapted to provide a plurality of regions for image forming.

12. A device as described in claim 6 wherein said second barrier layer is a composite consisting of two separate layers.

* * * * *